(12) United States Patent
Spalding et al.

(10) Patent No.: US 8,544,419 B1
(45) Date of Patent: Oct. 1, 2013

(54) LIVESTOCK INSECT-REMOVAL SYSTEMS AND RELATED METHODS

(71) Applicants: Thomas James Spalding, Reno, NV (US); Zachary Thomas Spalding, Scranton, PA (US); Steven Smith Denning, Raleigh, NC (US)

(72) Inventors: Thomas James Spalding, Reno, NV (US); Zachary Thomas Spalding, Scranton, PA (US); Steven Smith Denning, Raleigh, NC (US)

(73) Assignees: Spalding Laboratories, Inc., Reno, NV (US); North Carolina State University, Raleigh, NC (US)

( * ) Notice: Subject to any disclaimer, the term of this patent is extended or adjusted under 35 U.S.C. 154(b) by 0 days.

(21) Appl. No.: 13/682,593

(22) Filed: Nov. 20, 2012

Related U.S. Application Data (60) Provisional application No. 61/563,208, filed on Nov. 23, 2011.

(51) Int. Cl.
*A01K 13/00* (2006.01)
(52) U.S. Cl.
USPC ............ 119/678; 119/651; 119/652; 119/656

(58) Field of Classification Search
USPC .............. 119/951, 678, 622, 650, 652, 656, 119/660, 659, 661, 662, 663, 664, 600
See application file for complete search history.

(56) References Cited

U.S. PATENT DOCUMENTS

| | | | | |
|---|---|---|---|---|
| 4,301,766 A * | 11/1981 | Piccone | ........................ | 119/482 |
| 4,729,147 A * | 3/1988 | Armbruster | ...................... | 15/314 |
| 4,799,460 A * | 1/1989 | Kuhl | ................................ | 15/344 |
| 5,768,748 A * | 6/1998 | Silvera et al. | ................... | 15/402 |
| 5,957,090 A * | 9/1999 | Larson | ........................... | 119/600 |
| 6,230,660 B1 * | 5/2001 | Greeson | ........................ | 119/665 |
| 7,011,044 B2 * | 3/2006 | Segura Jobal | ................. | 119/671 |
| 7,011,046 B1 * | 3/2006 | Kidwell | ........................ | 119/678 |
| 7,980,200 B2 * | 7/2011 | Troutman | ..................... | 119/651 |
| 8,176,652 B2 * | 5/2012 | Donahue et al. | ................ | 34/399 |

* cited by examiner

*Primary Examiner* — Yvonne Abbott
(74) *Attorney, Agent, or Firm* — Carr & Ferrell LLP (57) ABSTRACT

Livestock insect-removal systems and methods. According to one embodiment, the system may comprise a structure with a defined path for passage of livestock. The system may comprise a container removably attached to the structure and a vacuum device within the container configured to generate a change in pressure within the container. The system may comprise a first duct to expel air from the container and direct air across the path and displace or dislodge insects. The first duct may further comprise a vent to expel bypass air from the first duct. The system may comprise a second duct, positioned along the path to draw air and dislodged insects into the container.

20 Claims, 11 Drawing Sheets

LIVESTOCK INSECT-REMOVAL SYSTEMS AND RELATED METHODS

CROSS-REFERENCE TO RELATED APPLICATIONS

This application claims the benefit of U.S. Provisional Application No. 61/563,208, filed on Nov. 23, 2011, which is incorporated by reference herein.

BACKGROUND

1. Field of the Invention

The present invention relates generally to insect control. In particular, the disclosed subject matter relates to livestock insect removal systems and methods.

2. Background Art

The horn fly is a persistent pest of livestock, particularly pastured cattle. It is one of the most economically damaging pests of livestock, costing the cattle industry approximately $876 million per year in lost production. High densities of horn flies cause stress and blood loss in cattle, impacting their grazing habits, decreasing milk production, and reducing weight gains.

The economic threshold when evaluating horn fly control is usually defined as the number of flies on one side of a cow, which creates enough production losses to justify treatment. The numbers vary depending on several factors, including quality of forage, weather, and condition of the animal. The generally accepted economic threshold for horn flies on cattle is about 200 horn flies per animal. However, for dairy cattle the threshold may be as low as 50 horn flies per animal.

Traditionally, horn flies have been managed through the use of insecticides, including dusts, sprays, rub-ons, pour-ons, feed activities, cable backrubbers, and insecticide impregnated ear tags. However, resistance to certain pesticides, such as pyrethroid insecticides, is becoming widespread throughout much of North America, making control increasingly difficult. While changing formulations or active ingredients may reduce the density of horn flies, some insecticides are restricted from use on specific livestock, e.g., lactating dairy cattle.

Previous attempts at trapping insects have utilized a passive walk-through insect trap. As the livestock moves through a series of canvas strips, the insects are brushed off from the back and sides of the animal. The dislodged insects are then trapped in a series of baffles as they attempt to escape. However, field studies indicate that the level of control provided by the passive trap is less than that of ear tags.

In light of the above, there exists a need for an effective and low-maintenance technology for insect removal without the use of insecticides.

SUMMARY OF THE INVENTION

Embodiments of the present invention overcome or substantially alleviate prior problems associated with controlling horn flies or other livestock pests. According to one embodiment of the invention, a system may include a structure comprising a path for livestock to pass. A container holding a vacuum device may be situated on the structure over the path. The container may be connected to ducts to direct airflow into and out of the container. The pressure side or duct may be positioned along the path to displace insects on or around livestock passing through the path. The intake or vacuum side ducts may be positioned along or above the path to draw in displaced insects for containment. Optionally, curtains may be used to aid in dislodging or displacing insects from the livestock.

The system may also include one or more vents located on the output or pressure side duct. The vent may help regulate the airflow directed across the path by rerouting some of the airflow. The amount of air rerouted may be controlled by removable nozzles to restrict airflow. Optionally, another vent may be configured open if pressure exceeds a threshold, allowing pressure to be released in the event the pressure side duct becomes blocked.

The container may include screens or other filters to prevent the insects or debris from reaching the vacuum device or pressure side ducts. The container may be connected to an insect trap for collecting insects received through the vacuum side ducts. The insect trap may include a removable container or have a release mechanism to discard trapped insects.

DETAILED DESCRIPTION

The present invention provides exemplary systems and methods for livestock insect removal. In exemplary embodiments, the insect removal system comprises a structure with a path for livestock to pass through.

Figure 1:
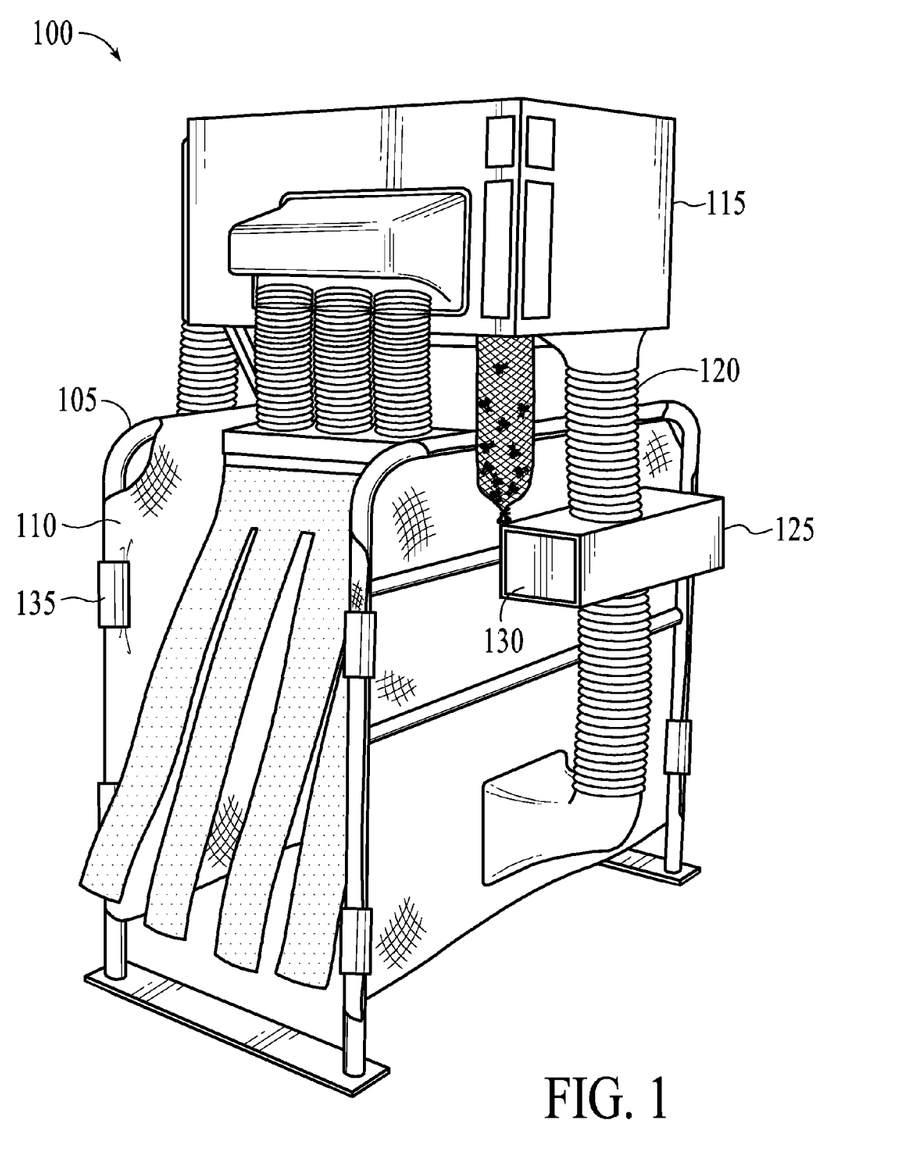
FIG. 1 depicts a view of an embodiment of the invention.

FIG. 1 depicts a view of an exemplary embodiment of a livestock insect removal system 100. A structure 105 comprises a path for livestock to pass through. The structure 105 may be comprised of PVC, wood, metal, or other similar sturdy material. For example, the frame of the structure 105 may comprise tubular metal supports as depicted in FIG. 1. Optionally, the portions of the structure 105 comprising sides of the path may be covered to prevent the escape of insects dislodged from livestock. A covering 110 material may be comprised of mesh, screens, fabric, plastic, canvas, vinyl, wood, metal or other similar materials. The covering 110 may be attached to the structure 105 using clips 135. Optionally, alternative attachments such as ties, screws, bolts, welds, other similar fasteners, or a combination thereof may be used. The covering 110 may be transparent (i.e., clear) or opaque. The covering 110 may be in any color, including white. Color selection may be made based on colors which induce the livestock to pass through or colors the livestock is not averse to.

A container 115 may be attached above the structure 105. The container 115 may be removable for ease of transportation or maintenance. An exemplary attachment may include struts with concave joining members conformed to fit the frame of the structure 105 as depicted in FIG. 1. Other methods of attachment may include screws, bolts, adhesives, rivets, welds, or other similar fasteners. The material comprising the container 115 may be metal, wood, plastic, or other similar materials, or a combination thereof. The exemplary container 115 is depicted in the shape of a rectangular prism, but other shapes with an interior space may be used.

Figure 7:
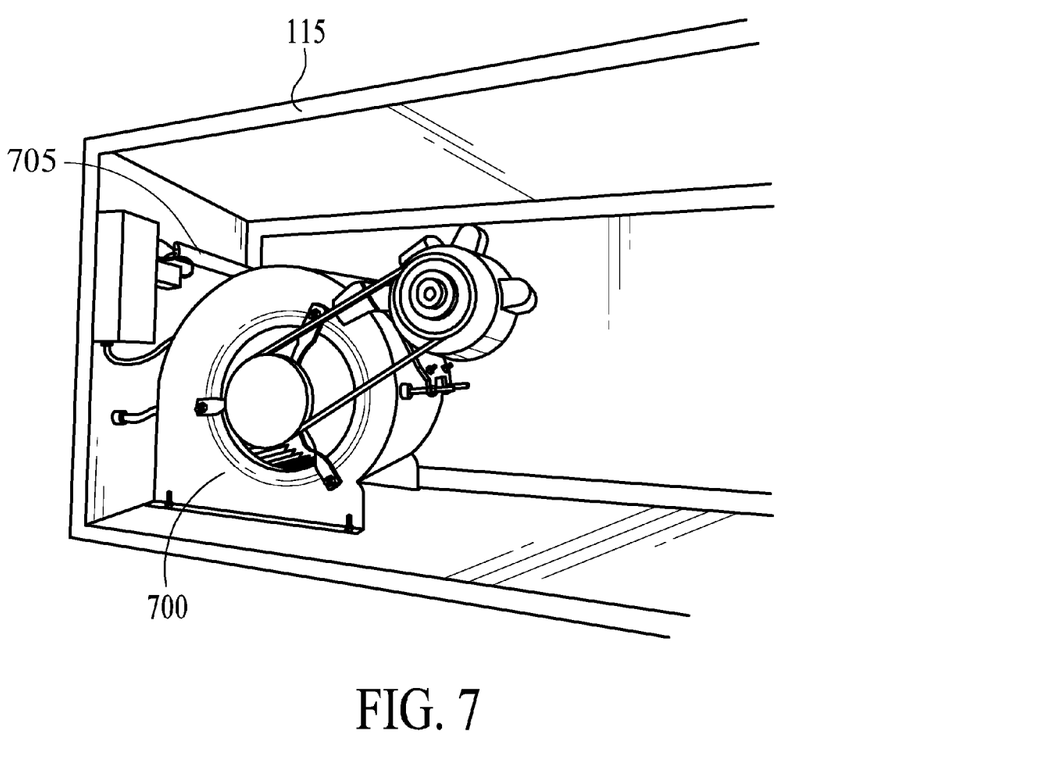
FIG. 7 depicts an interior view of an embodiment of the container.

The container 115 can house a vacuum device 700 as shown in FIG. 7. While the figure depicts a single vacuum device 700, any number of vacuum devices may be used. The vacuum device 700 is capable of causing a change in pressure within the container 115. An exemplary vacuum device 700 may be a turbine connected to a motor. Other similar devices may be used to generate a vacuum. Optionally, the container 115 may comprise a light source 705 to attract insects and keep the inside the container. The light source 705 may illuminate when the vacuum device 700 is active and darken when the vacuum device 700 is turned off.

As depicted in FIG. 1, several openings may be included on the container 115. Such openings may be connected to ducts, a hood scoop, or an intake mount to guide airflow into and out of the container 115. The ducts may be comprised of rubber, metal, linked-metal, plastic, polymers, or other similar material and may be flexible, semi-flexible, or rigid. The hood scoop or intake mount may be comprised of rubber, metal, plastic, polymers, or other similar material. The ducts, hood scoop, or intake mount may be connected to the container 115 using screws, bolts, rivets, adhesives, clamps, fasteners, or other similar methods of attachment.

Figure 5:
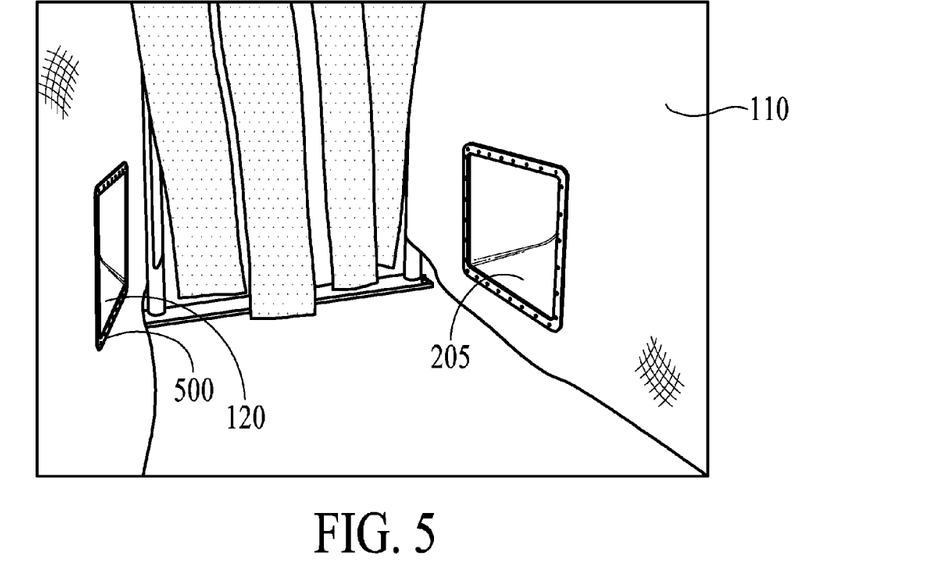
FIG. 5 depicts an exemplary configuration of the ducts along the path in an embodiment of the invention.

In this exemplary embodiment, the vacuum device 700 is configured to direct its entire output through a pressure side duct 120. The pressure side duct 120 may be attached to the covering 110 on a side of the structure 105, where an opening in the covering 110 is located. Such attachment may be performed using screws, bolts, rivets, adhesives, clamps, fasteners, or other similar methods of attachment. Optionally, the area surrounding the attachment may be reinforced to prevent damage to the covering 110. Exemplary methods of attachment may include lining the edge of the opening with a metal frame 500 or other reinforcing material, as shown in FIG. 5. The pressure side duct 120 directs air across the path to dislodge insects from livestock passing though the structure 105. An optional nozzle (not shown) may be included on the pressure side duct 120 assist in directing the airflow.

In another embodiment of the present invention, the pressure side duct 120 may be adjustable (e.g., raised or lowered) to accommodate livestock of varying heights.

Optionally, the pressure side duct 120 may include a vent 125, which allows bypass air to be released from the duct to help maintain the vacuum in the system. Removable nozzles or restrictors may be attached to the vent 125 to adjust the amount of bypass air released. Optional embodiments may utilize an adjustable valve (e.g., an a flow control valve, a metering valve, a screw controlled valve, etc.) or other similar mechanisms to control the amount of bypass air released. The regulation of the bypass air may allow for an increased capture rate of insects as it may prevent insects from being ejected from the structure 105.

In another embodiment, the system may have a second vent 130 on the pressure side duct 120. The second vent 130 may contain a mechanism which opens the second vent 130 once a threshold pressure is reached (e.g., if livestock block or partially block the pressure side duct 120 opening, calibrating the mechanism to open the vent at a specific threshold to maintain vacuum in the system, etc.). For example, such a mechanism may be a flapper valve held closed with a spring. The second vent 130 may allow the system to maintain a vacuum in the event the pressure side duct 120 is impeded, for example by livestock blocking the pressure side duct 120 opening which directs air across the path.

The air expelled from the pressure side duct 120 may be directed towards the opening of a vacuum side duct 205 to draw the insects into the container 115. In one embodiment, as illustrated in FIG. 5, the vacuum side duct 205 may receive the majority of the air expelled from the opening of the pressure side duct 120. Optionally, the vacuum side duct 205 may receive all or substantially all of the air expelled from the opening of the pressure side duct 120, taking account loss of air due to the interference of the passing livestock. This exemplary configuration allows for the system to collect a majority of the insects dislodged from the livestock and reduces the number of dislodged insects that escape or are blown away from the system. In another embodiment of the present invention, the vacuum side duct 205 may be adjustable (e.g., raised or lowered) to accommodate livestock of varying heights corresponding to the adjustable pressure side duct 120 described above.

Figure 2:
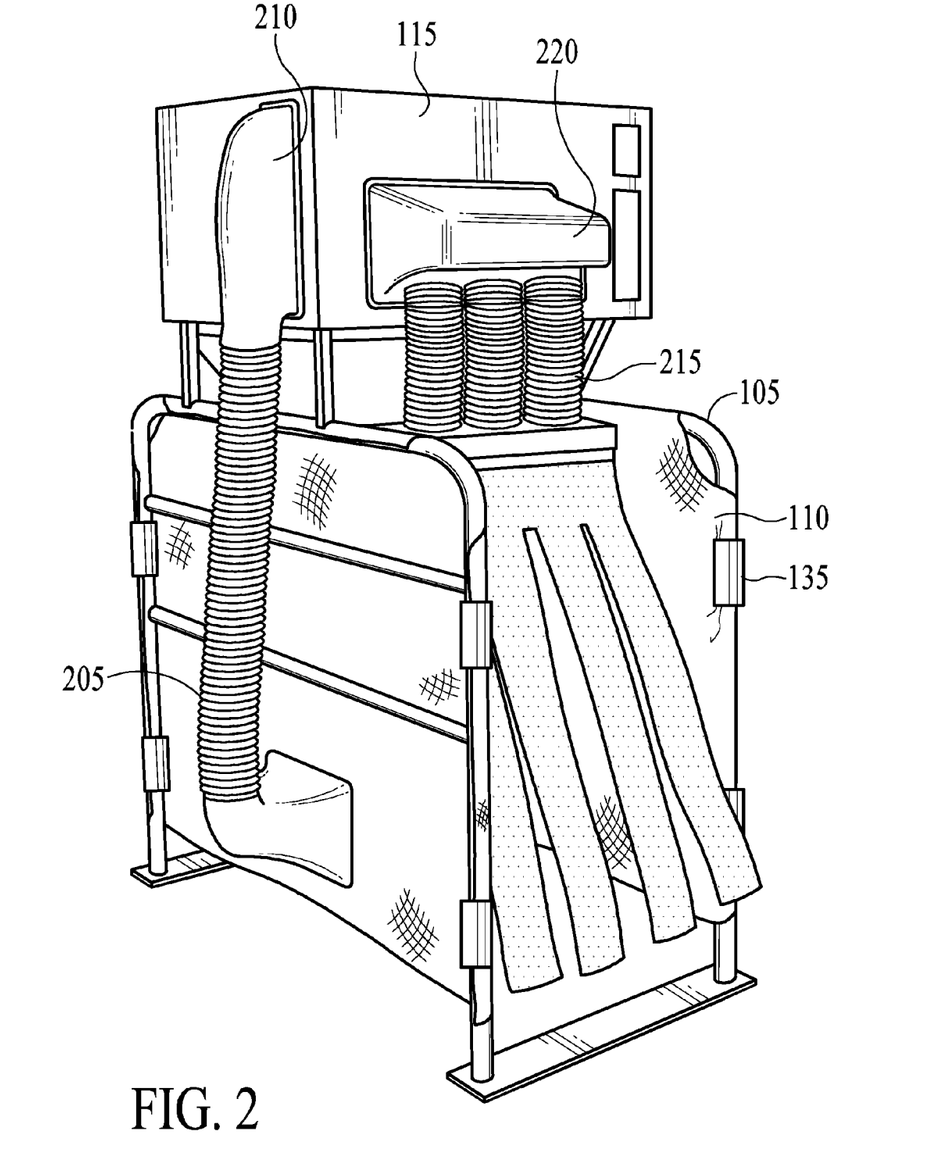
FIG. 2 depicts another view of an embodiment of the invention.

As shown in FIG. 2, the vacuum side duct 205 may be attached to an opening in the covering 110 on the opposite side of the path from the pressure side duct 120. The attachment for the vacuum side duct 205 may be similar to the pressure side duct 120 as described above. Optionally, a nozzle may be used to attach the vacuum side duct 205 to the covering 110 which may aid in receiving all or substantially all of the air expelled from the pressure side duct 120.

Figure 9A:
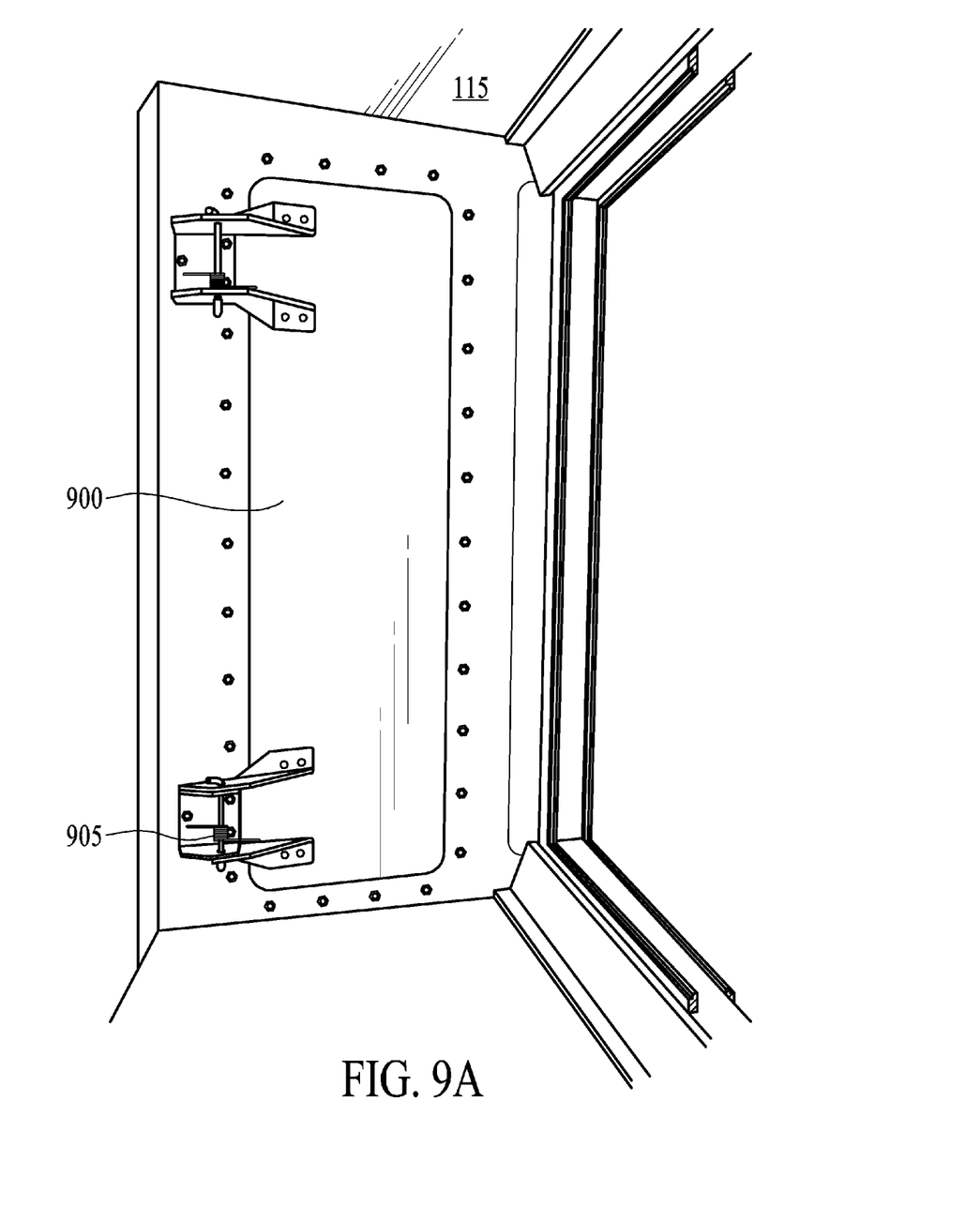
FIG. 9A depicts an embodiment of the interior valves for the vacuum side duct.

The vacuum side duct 205 may be connected directly to the container 115. In an alternate embodiment, the vacuum side duct 205 may be attached to the container 115 using an intake mount 210. Optionally, as shown in FIG. 9A, one or more valve mechanisms 900 may be located within the vacuum side duct 205 or the interior of the container 115 connected to the vacuum side duct 205 or intake mount 210. Such a valve mechanism 900 may be a door which opens while the system is generating a vacuum and closes once the vacuum stops. The door may be assisted in closing or opening by springs 905. Optionally, other mechanisms may be used, such as flexible inlet doors, valves, or other similar mechanisms. These valve mechanisms 900 aid in preventing the escape of insects drawn into the container 115.

In an optional embodiment the vacuum side duct 205 may include a vent (not shown). The vent may be attached to a duct connected to an optional plenum chamber (not shown). A plenum chamber is defined herein as a chamber or container for moving air under a pressure to which one or more ducts are connected. The plenum chamber may be attached to the structure 105 and positioned over the entrance of the path. Optionally, in a bidirectional system embodiment, the plenum chamber may be removable to be positioned over the path where livestock enter. This embodiment may allow for the device to capture easily dislodged insects, such as face flies, prior to the livestock entering the structure 105. Optionally, the height of the plenum chamber may be adjustable (e.g., capable of being raised or lowered) to accommodate livestock of various size (e.g., smaller heifers, larger dairy cows, etc.)

Figure 9B:
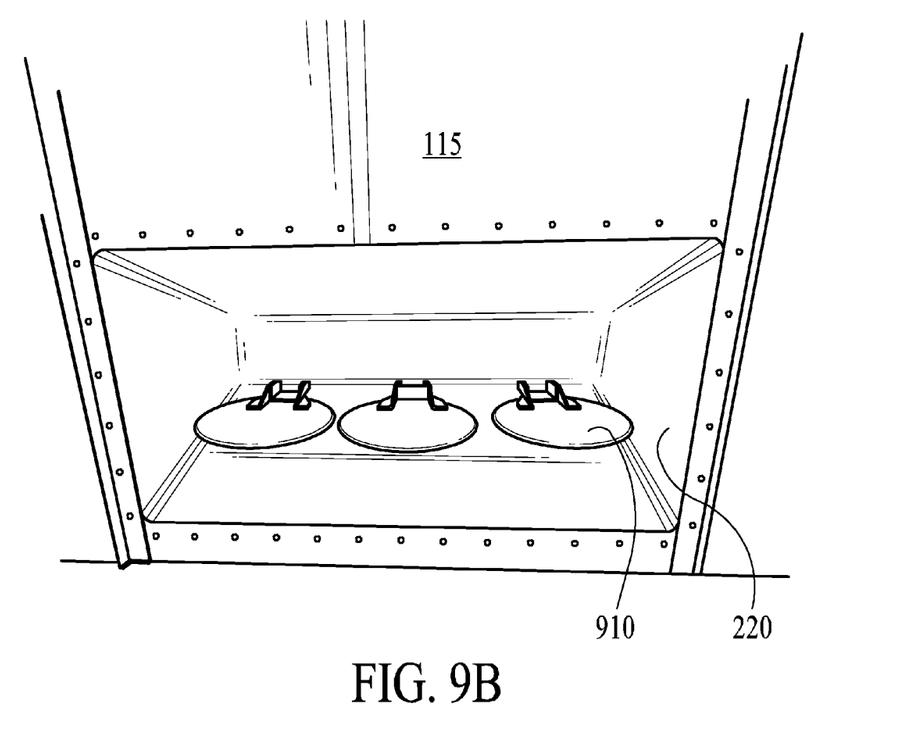
FIG. 9B depicts an embodiment of the interior valves for the hood scoop.

The system may also include one or more overhead vacuum ducts 215. The overhead vacuum ducts 215 may be attached directly to the container 115. Optionally, the overhead vacuum ducts 215 may be attached to a hood scoop 220 connected to the container 115. The hood scoop 220 may be configured for the overhead vacuum ducts 215 to be perpendicular to the path as shown in FIG. 2. Alternate configurations of the hood scoop 220 may angle the connection to the overhead vacuum ducts 215, providing a curve in the overhead vacuum ducts 215. Optionally, the connection of the overhead vacuum ducts 215 and the hood scoop 220 may include additional reinforcements or braces to accommodate bidirectional passage of livestock without damaging the overhead vacuum ducts 215. As shown in FIG. 9B, the overhead vacuum ducts 215 or the hood scoop 220 may include similar valve mechanisms 910 on the interior of the container 115 as the vacuum side duct 205 or intake mount 210 described above to prevent the escape of insects, i.e., valves, flexible inlet doors, spring controlled doors, etc.

Figure 6:
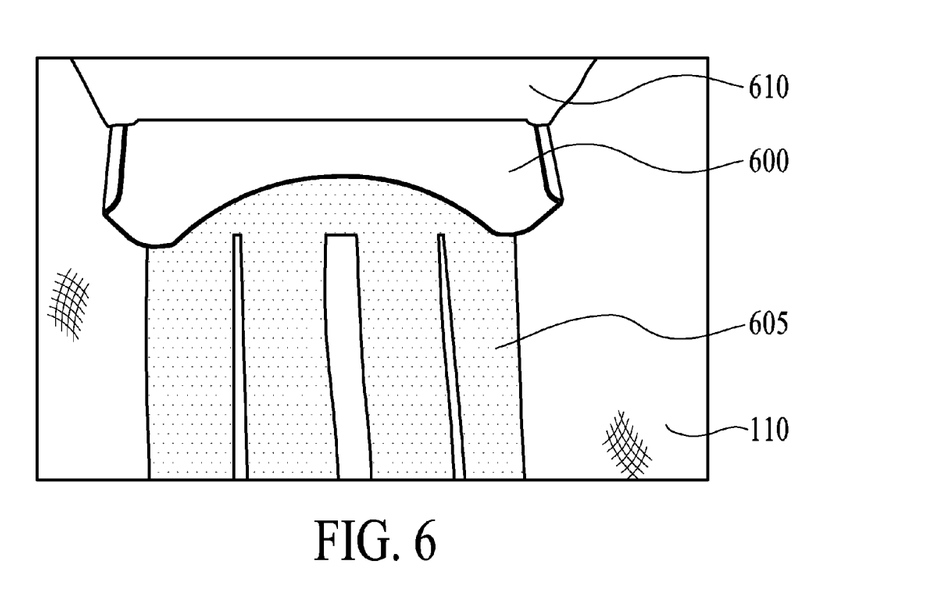
FIG. 6 depicts an exemplary embodiment of the overhead nozzles.

In an optional embodiment, the height of the overhead vacuum nozzle 600 may be easily adjustable. Such adjustment may be performed manually or automatically for varying sizes of livestock (e.g., smaller heifers and larger dairy cows). For example, flexible ducts may be used in conjunction with a pulley system to adjust the height of the overhead vacuum nozzle 600 up or down. Optionally, other mechanisms (e.g., pneumatic cylinders, hydraulic cylinders, telescopic cylinders, etc.) may be used to raise or lower the overhead vacuum nozzle 600.

As shown in FIG. 6, the overhead vacuum ducts 215 may be connected to a nozzle 600. The nozzle 600 may be configured to conform to the size or shape of the livestock passing through the structure 105. The overhead vacuum ducts 215 or the nozzle 600 may include an attached curtain 605 to aid in dislodging insects. The curtain may be comprised of strips of fabric, vinyl, or other similar flexible or semi-flexible material. The curtain 605 may be transparent or opaque and be in any color, including white. Optionally, excessive movement of the overhead vacuum ducts 215 due to passage of livestock may be reduced through use of a tether 610. The tether 610 aids in keeping the overhead vacuum ducts 215 in position. The tether may use ropes, chains, fabric, vinyl, or other flexible or semi-flexible material.

In another embodiment, instead of a physical curtain 605, excess pressure generated by the system may be used to create an air curtain. The air curtain is defined to be a directionally-controlled airstream. The air curtain may span the entire height and width of the passage. It may dislodge insects from livestock, including those on the back of the animal. For example, in an exemplary embodiment the bypass air from the vent 125 on the pressure side duct 120 may be redirected and used as the source for the air curtain. Alternatively, a separate attachment from the container 115 may provide the source of the pressure for the air curtain. Optionally, a separate device or motor may be used to generate the air curtain. In one embodiment, the air curtain may be positioned such that it does not interfere with the interactions of pressure side duct 120, vacuum side duct 205, or the overhead vacuum ducts 215.

Figure 10:
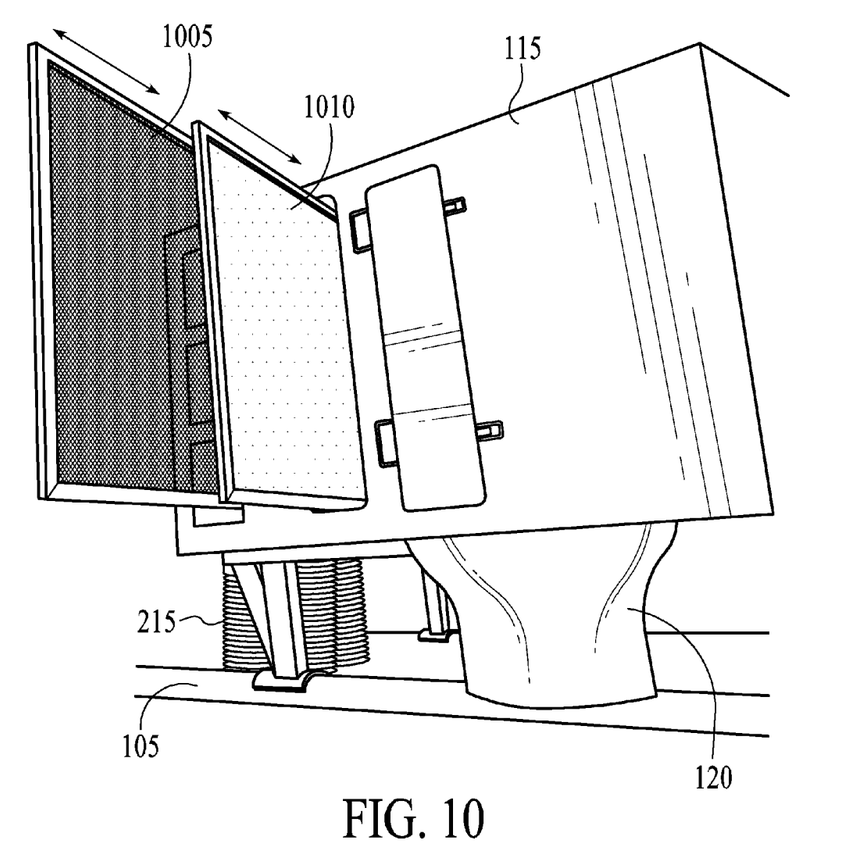
FIG. 10 depicts an embodiment of the filter configuration in the container.

The device may include screens within the container 115. The screens partition the container 115 and may prevent insects and other debris from reaching the vacuum device 700. The screens may be located between the vacuum device 700 and the areas of the container 115 where insects are drawn in, such as the intake mount 210 or the hood scoop 220. As shown in FIG. 10, an embodiment of the present invention may utilize two screens. A first screen 1005 may comprise a coarse mesh to trap insects. A second screen 1010 may include a fine mesh to keep hair or other debris from reaching and clogging the vacuum device 700.

The system may be configured with a size and dimensions suitable for cattle to proceed for insect removal. Alternatively, other sizes and dimensions suitable for other livestock to move through the path for insect removal may be contemplated.

Figure 3:
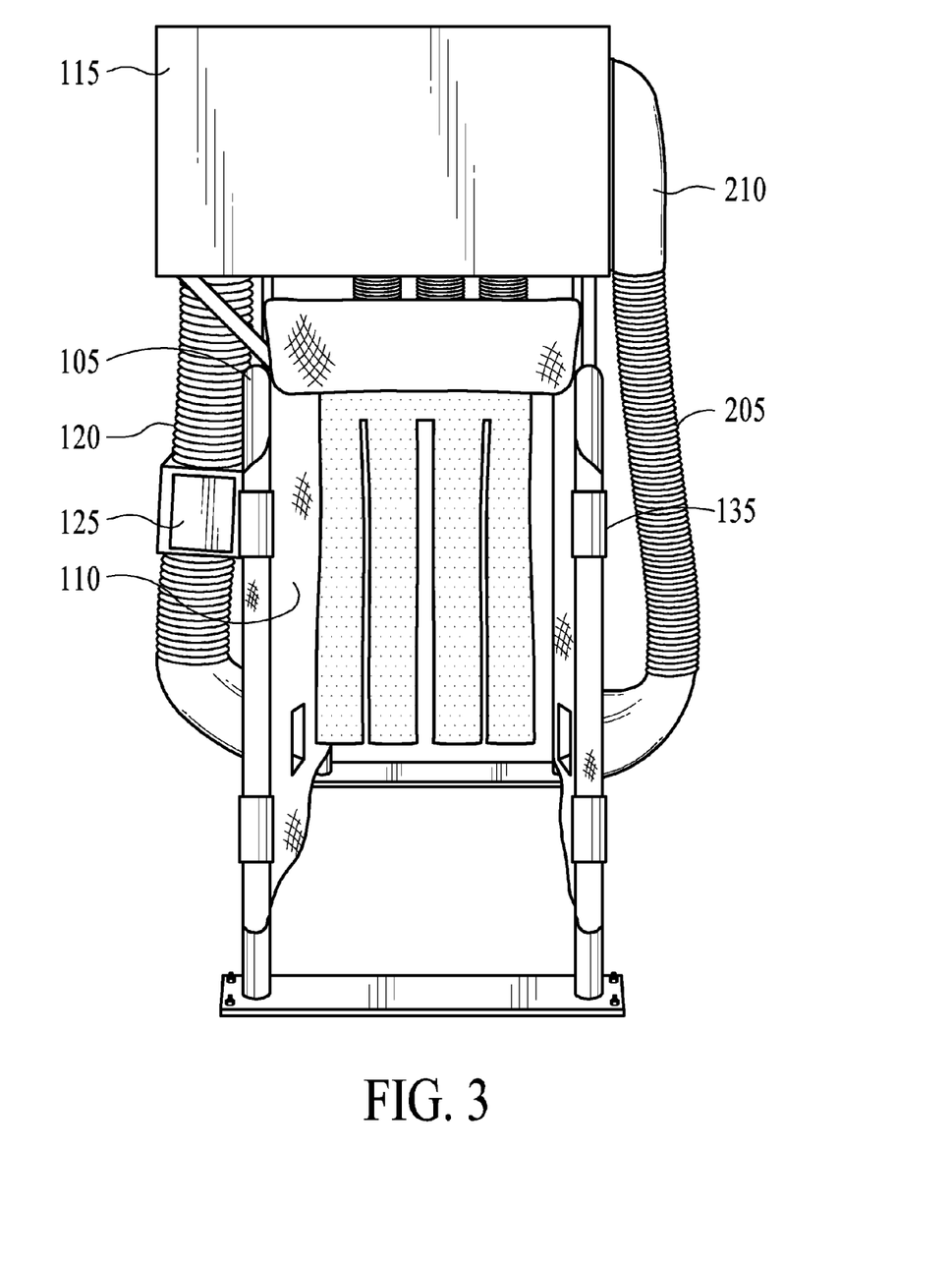
FIG. 3 depicts a front view of an embodiment of the invention.
Figure 4:
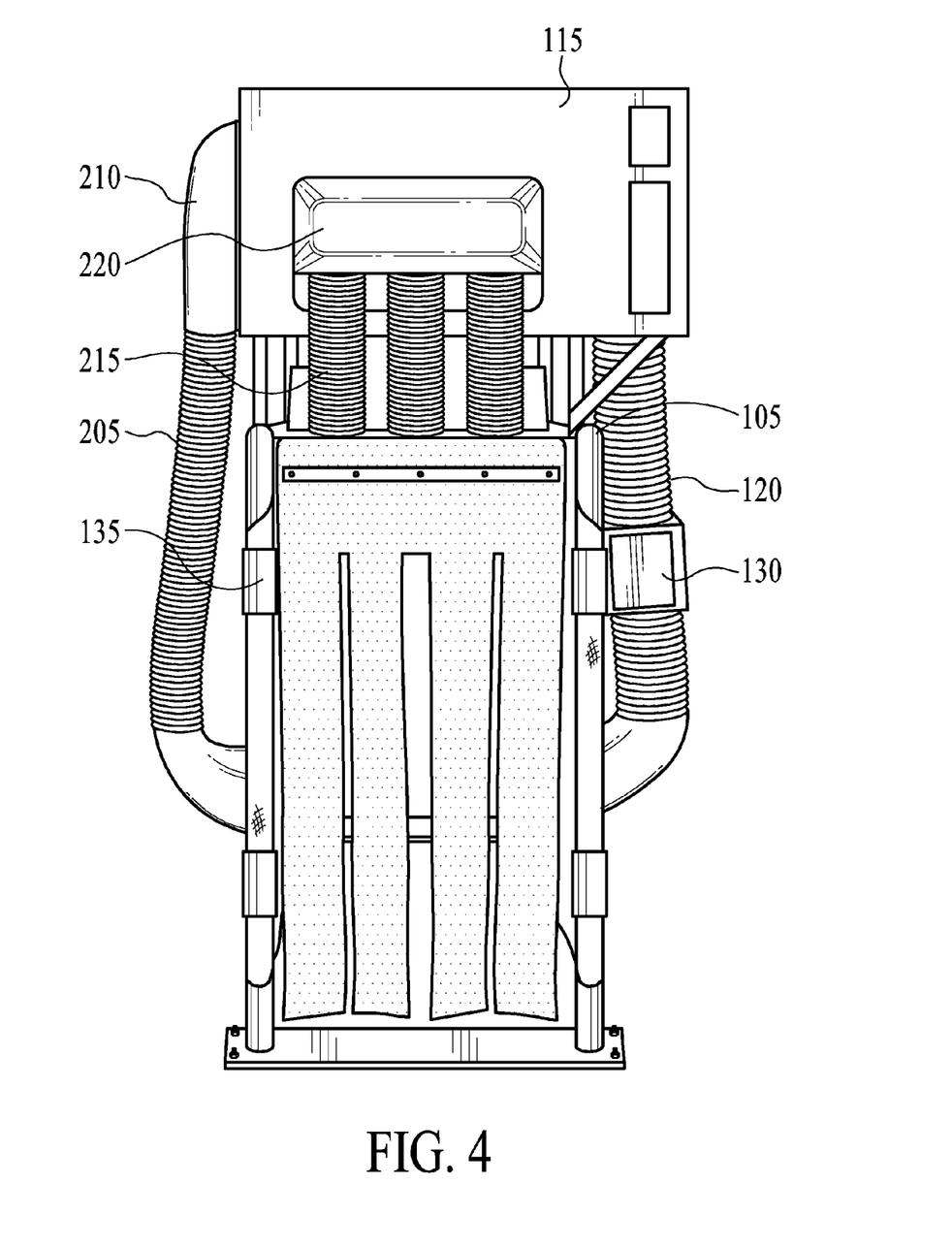
FIG. 4 depicts a rear view of an embodiment of the invention.

FIG. 3 illustrates the entrance of an embodiment of the system. FIG. 4 depicts the exit or a rear view of an embodiment of the system. While the system is contemplated to allow livestock to pass through in one direction, e.g., entering as depicted through FIG. 3, the system may accommodate livestock entering from either direction.

Figure 8A:
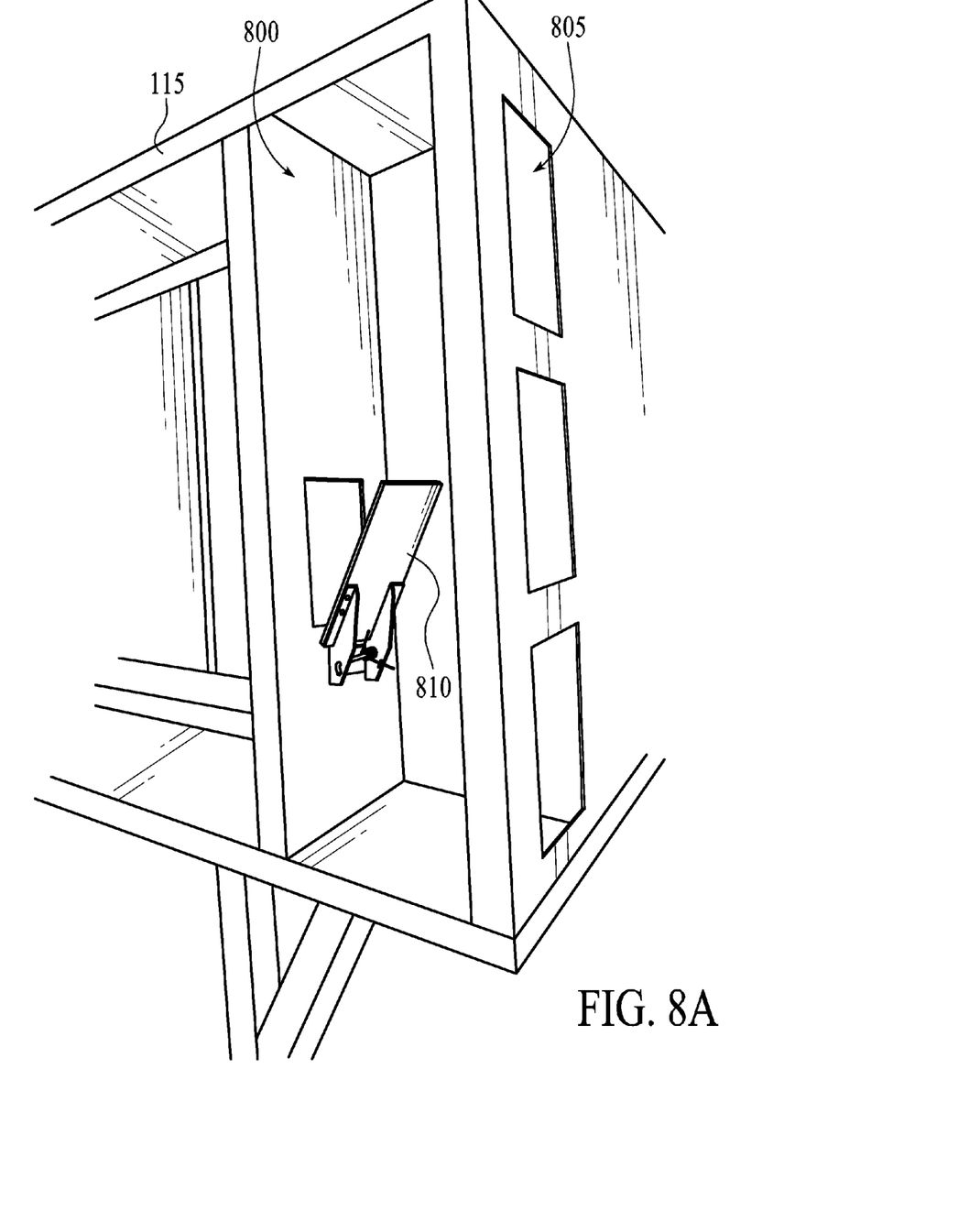
FIG. 8A depicts an exemplary embodiment of the interior of the insect trap.
Figure 8B:
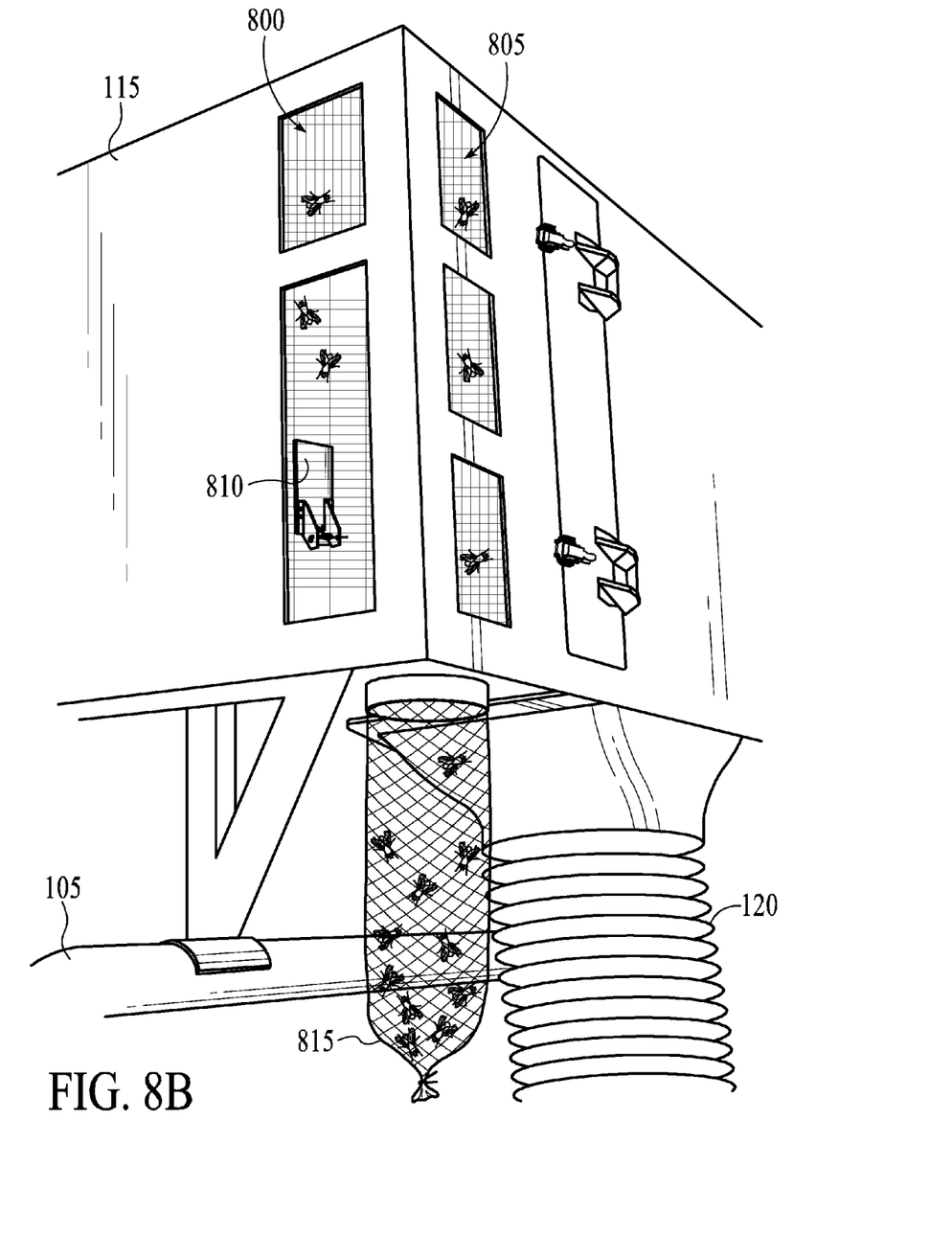
FIG. 8B depicts an exterior view of an embodiment of the insect trap.

FIGS. 8A and 8B illustrated an embodiment of the present system including an insect trap 800 for the collection of insects received by the system. The insect trap 800 may be integrated within the container 115 or a separate device attached to the exterior of the container 115. The insect trap 800 is accessible to insects drawn into the container 115. Such accessibility may be through a pathway, hole, tube, or other similar passageway allowing insects to enter the insect trap 800. The exterior of the insect trap 800 may include transparent or partially transparent sections 805 to attract insects gathered by the system. Alternatively, an artificial light source, such as a light bulb, may be used to attract insects into the insect trap 800. The insect trap 800 may also comprise a collection area. The collection area may serve to gather the dead insects for easy disposal. One embodiment of the collection area may be a mesh sleeve 815 attached to an opening at the bottom of the insect trap 800, the bottom of the mesh sleeve 815 being held shut with a clip. Other embodiments may include a removable container, a bag, a latched door, or other similar configurations which ease disposal of trapped insects.

Another embodiment of the insect trap 800 may include selective access between the insect trap 800 and the container 115. Such selective access may include a door 810 or other mechanism to prevent insects from re-entering the container 115. The door 810 may be configured to close while the device is generating a vacuum and open when the device is off. Optionally, the door 810 may include a spring to assist in closing or opening the door.

Optionally, the invention may comprise a proximity sensor to automatically activate the system as livestock enter. Such a sensor may be mechanical or electric and include switches or motion sensors. Motion sensors may include acoustic, optical, infrared, magnetic, laser, radar, ultrasonic, vibration, or other similar sensors.

The livestock insect removal system 100 may be powered by various energy sources. For example, AC power, battery power, generators, solar power, etc.

In another embodiment of the livestock insect removal system, the height of the system may be adjustable. In such an embodiment, the structure comprising the path may comprise a parallelogram linkage, scissor lift, or other height adjustment mechanism (e.g., pneumatic cylinders, hydraulic cylinders, telescopic cylinders, lifts, etc.). Optionally, the height may be adjustable in fixed stages. For example, a parallelogram linkage may allow for three height levels: a first level (at 0 or 180 degrees), a second level (at 45 degrees), and a third level (at 90 degrees). Any number of stages may be used or envisioned. In one embodiment, the height adjustment may be easily operated by a lever to raise and lower the container. Other methods of height adjustment may be used, such has pneumatics, hydraulics, motors, etc. The height adjustability of the system may allow for accommodating livestock of various sizes. Additionally, the height adjustment may ease transportation, i.e., lowering the center of gravity of the system.

In another embodiment of the livestock insect removal system, a pressure generating device (e.g., a turbine, carpet dryer, fan, etc.) may be attached to the side of the structure 100 in lieu of a pressure side duct 120. The pressure generating device may direct a stream of air across the path designated by the structure 100 to dislodge insects from passing livestock.

Optionally, the container 115 may be located on the vacuum side of the structure 100. The container 115 may be attached or mounted to the side of the structure 100 or on the ground. The container 115 may contain one or more vacuum devices to draw dislodged insects into the container 115. In this embodiment, the container 115 may merely vent the excess pressure generated by the vacuum device. Optionally, the vacuum device may be comprised of motors within the vacuum or inlet tubes or ducts.

Optionally, overhead vacuum ducts connected to the container 115 may be attached to the structure 100 to overhang the path. The overhead vacuum ducts may function similarly to those described in FIG. 2 to capture insects on the back of livestock. Optionally, the height of the overhead vacuum ducts may be adjustable as described above. Other aspects of the livestock insect removal system, such as the insect trap, screen configuration, air curtain, etc., may be similar to the embodiments described above.

Optionally the livestock insect removal system 100 may be fixed to a particular location, e.g., outside a barn, or mobile, allowing for placement in the pastures or near watering stations. Embodiments of a fixed location livestock insect removal system 100 may comprise a high container 115. Optionally, embodiments of a mobile livestock insect removal system 100 may comprise a low container 115.

A mobile livestock insect-removal system 100 may use wheels attached to the structure 105. One embodiment may utilize a four wheel combination, but any number of wheels may be used to allow for stable transportation. Optionally, wheels may be of sufficient size and width (e.g., tractor wheels) to allow for transportation over unpaved terrain (e.g., pastures or fields). Optionally, various other mechanisms which allow for mobility may be used, such as caterpillar tracks, skids, or other similar devices. Mobile embodiments may include a trailer hitch (not shown) or other similar mechanism attached to the structure 105, allowing the livestock insect removal system 100 to be towed by a tractor, truck, or other vehicle.

In optional embodiment, the structure 105 of the livestock insect removal system 100, may be designed to allow for stable transportation via a forklift, forklift attachment, fork truck, front loader, tow-motor, or other jacking device. Such a design may include a portion of the structure with holes conforming to the forks allowing stable transport. For example, the structure 105 may include parallel tubular members along the ground lining the length of the path with a set of openings conforming to a standard forklift. Optionally, multiple sets of openings may be provided to allow for varying types of forklifts. Mobile embodiments as described herein may be combined with height adjusting embodiments to aid in stable transportation through the system's lower center of gravity.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A livestock insect-removal system comprising:
   a structure defining a path for passage of livestock;
   a container removably attached to the structure;
   a vacuum device within the container, the vacuum device configured to generate a change in pressure within the container;
   a first duct configured to expel air from the container, the duct having a first end and a second end, the first end attached to the vacuum device and the second end positioned to direct air across the path;
   a vent on the first duct configured to expel bypass air from the first duct; and
   a second duct configured to draw air into the vacuum device container, the duct having a first end and a second end, the first end positioned along the path and the second end being attached to the container.

2. The system of claim 1, wherein the vent comprises an adjustable valve.

3. The system of claim 1, further comprising a detachable nozzle coupled to the vent, wherein the nozzle regulates the amount of bypass air expelled from the first duct.

4. The system of claim 1, further comprising a second vent on the first duct, the second vent configured to open if pressure exceeds a threshold.

5. The system of claim 1, wherein the first end of the second duct is positioned to receive substantially all of the air directed across the path by the first duct.

6. The system of claim 1, further comprising a hood scoop attached to the container;
   a plurality of ducts with first ends and second ends, the first ends coupled to the hood scoop; and
   a nozzle coupled to the second ends of the plurality of ducts, wherein the nozzle overhangs the path.

7. The system of claim 6, further comprising a valve attached to the hood scoop inside the container, wherein the valve prevents insects from exiting the container.

8. The system of claim 1, further comprising a first screen and a second screen partitioning the container's interior space, the first screen comprising a coarse screen material and the second screen comprising a fine screen material, wherein the screens are configured to prevent debris and insects from reaching the vacuum device.

9. The system of claim 1, further comprising an insect trap, the insect trap accessible to insects from the container.

10. The system of claim 9, wherein the insect trap further comprises a section of transparent material.

11. The system of claim 9, further comprising a door within the insect trap.

12. The system of claim 9, further comprising a collection area attached below the insect trap, wherein the collection area accumulates insects for disposal.

13. The system of claim 12, wherein the collection area is comprised of a mesh sleeve and held shut with a clip.

14. The system of claim 1, further comprising a material for covering the structure.

15. The system of claim 14, wherein the material is white.

16. The system of claim 1, further comprising an intake port on the second duct;
   a third duct with a first end and a second end, the first end coupled to the intake port; and a plenum chamber coupled to the second end of the third duct and attached to the structure overhanging the path.

17. The system of claim 1, further comprising a valve attached to the second end of the second duct on the interior of the container, wherein the valve prevents insects from exiting the container.

18. The system of claim 1, wherein the path defined by the structure allows bidirectional passage of livestock.

19. A livestock insect-removal system comprising:
a structure defining a path for passage of livestock;
a container removably attached to the structure;
a vacuum device within the container, the vacuum device configured to generate a change in pressure within the container;
a first duct configured to expel air from the container, the first duct having a first end and a second end, the first end attached to the vacuum device and the second end positioned to direct air across the path; and
a second duct configured to draw air into the vacuum device container, the second duct having a first end and a second end, the first end positioned along the path to receive substantially all the expelled air from the first duct and the second end being attached to the container.

20. A method for removing insects from livestock, the method comprising:
providing a path for passage of livestock;
activating a vacuum device within a container;
directing through a duct the majority of air expelled from the container across the path to dislodge insects from livestock on the path;
providing on the duct a bypass for air expelled from the container to maintain vacuum in the system; and
collecting substantially all the expelled air directed across the path into the container.

* * * * *